United States Patent Office 3,407,211
Patented Oct. 22, 1968

3,407,211
ACYLAMINOPHENYL HETEROCYCLIC KETONES
Leo Berger, Montclair, Arthur Stempel, Teaneck, Leo Henryk Sternbach, Upper Montclair, and Edward Wenis, Leonia, N.J., assignors to Hoffmann-La Roche Inc., Nutley, N.J., a corporation of New Jersey
No Drawing. Original application June 20, 1961, Ser. No. 118,243. Divided and this application Nov. 27, 1963, Ser. No. 326,341
8 Claims. (Cl. 260—326.3)

This application is a division of application Ser. No. 118,243, filed June 20, 1961.

This invention relates to 5-membered heterocyclic compounds and the process of making them. More particularly the invention relates to 3H-1,4-benzodiazepine compounds containing a 5-membered heterocyclic ring as a substituent in the 5-position. These compounds and their acid addition salts are valuable medicinal agents. Thus the invention comprehends said benzodiazepine compounds and their acid addition salts, the processes of making them and novel intermediates therefor.

More specifically the compounds of the invention are selected from the group consisting of compounds of the formula (I) 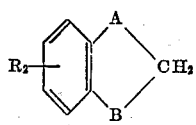

and their acid addition salts; wherein A is selected from the group consisting of

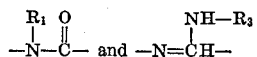

B is selected from the group consisting of

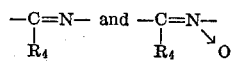

$R_1$ and $R_3$ are selected from the group consisting of hydrogen and lower alkyl; $R_2$ is selected from the group consisting of hydrogen, halogen, nitro and lower alkoxy; and $R_4$ is selected from the group consisting of pyrryl, furyl and thienyl.

Thus the benzodiazepine compounds of the invention conform to any of the four following formulas included within the scope of Formula I above.

(II) 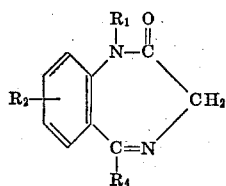

(III) 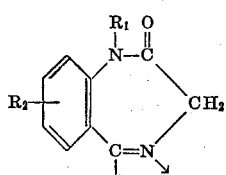

(IV) 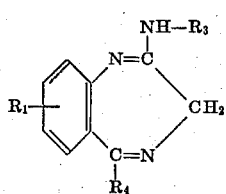

(V) 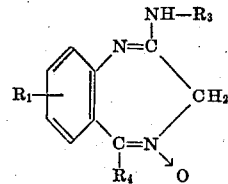

wherein $R_1$, $R_2$, $R_3$ and $R_4$ have the same meaning as above.

The compounds of Formula II are 5-$R_4$-3H-1,4-benzodiazepin-2(1H)-ones, those of Formula III are 5-$R_4$-3H-1,4-benzodiazepin-2(1H)-one 4-oxides, those of Formula IV are 2-amino-5-$R_4$-3H-1,4-benzodiazepines, and those of Formula V are 2-amino-5-$R_4$-3H-1,4-benzodiazepine 4-oxides.

The term lower alkyl comprehends both straight and branched chain lower alkyl groups such as methyl, ethyl, propyl, isopropyl, and the like. The term halogen includes all four halogens, i.e. bromine, iodine, fluorine and chlorine. Compounds conforming to Formulas II–V, i.e. Formula I, above are especially preferred where $R_2$ is chlorine. As set forth above the heterocyclic moiety ($R_4$) in the compounds of the invention is selected from the group consisting of pyrryl, furyl and thienyl. Thus, the invention comprehends a five-membered monoheterocyclic ring of the formula (VI) 

wherein Y is either >NH, >O or >S; joined to the 5-position atom of a 3H-1,4-benzodiazepine moiety by a carbon to carbon bond.

As stated above the compounds of Formulas II–V above form acid addition salts with medicinally acceptable acids. Thus the compounds form medicinally acceptable acid addition salts with both inorganic and organic acids such as mineral acids, e.g. hydrohalic acids, for example hydrochloric acid, hydrobromic acid, and the like, nitric acid, sulfuric acid, phosphoric acid, acetic acid, formic acid, fumaric acid, succinic acid, maleic acid, p-toluene sulfonic acid, methyl sulfonic acid, and the like.

The compounds of Formulas II–V above are prepared from ketones conforming to the following formula (VII) 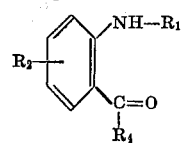

wherein $R_1$, $R_2$ and $R_4$ have the same meaning as above. Certain of these ketones are novel and can be prepared by reacting a 2-methyl-3,1-benzoxazin-4-one of the following formula (VIII) 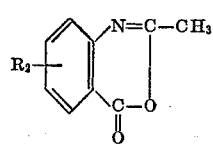

wherein $R_2$ has the same meaning as above, with a heterocyclic Grignard reagent wherein the heterocyclic moiety conforms to $R_4$, such as heterocyclic magnesium halide compound. Alternatively a heterocyclic lithium compound can be used. Examples of such are furyl lithium, pyrryl lithium, thienyl lithium, 2-thienyl magnesium bromide, 2-pyrryl magnesium bromide, 2-furyl magnesium bromide, and the like. The reaction produces a ketone conforming to Formula VII above.

The compounds conforming to Formula I above can be made from the compounds conforming to Formula VII by a variety of alternative routes. Of the compounds conforming to Formula I, those conforming to Formula II, i.e. 3H-1,4-benzodiazepin-2(1H)-ones can be prepared by several different methods of synthesis. They can be directly synthesized by the reaction of a 2-aminophenyl $R_4$ ketone (wherein $R_4$=pyrryl, furyl, thienyl) of Formula VII above with glycine or an ester thereof. According to this method the ketone is heated with glycine or a glycine ester; for example a glycine lower alkyl ester such as glycine ethyl ester. The reaction is preferably effected in a solvent such as pyridine, dimethyl formamide, or the like. It is also preferable to have an anion of a strong acid present in the reaction mixture and therefore it is convenient to use reagents in the form of a salt of a strong organic or inorganic acid, e.g. glycine hydrochloride, glycine ethyl ester hydrochloride, or part of the pyridine as pyridine hydrochloride.

3H - 1,4 - benzodiazepin - 2(1H) - one compounds corresponding to Formula II above can also be produced by reacting a ketone corresponding to Formula VII above with a haloacetyl halide, such as chloroacetyl chloride, bromoacetyl bromide and the like to produce a 2-haloacetaminophenyl $R_4$ ketone corresponding to the formula (IX)

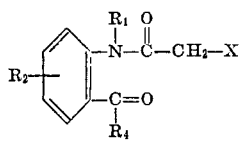

wherein $R_1$, $R_2$ and $R_4$ have the same meaning as above and X is a halogen.

The compounds corresponding to Formula IX can then be directly cyclized by reaction with ammonia to yield compounds corresponding to Formula II above. The compounds of Formula IX can also be reacted with ammonia so that the halogen atom is replaced by the amino group yielding a 2-aminoacetaminophenyl $R_4$ ketone which can then be cyclized to a compound corresponding to Formula II above.

2-aminophenyl $R_4$ ketones corresponding to Formula VII above wherein $R_1$ is hydrogen can be treated with hydroxylamine hydrochloride to form corresponding 2-aminophenyl $R_4$ ketoximes. The reaction of the oxime with chloroacetyl chloride produces a chloracetamino derivative which cyclizes to form a 2-chloromethyl-4-phenyl-quinazoline 3-oxide corresponding to the following formula (X)

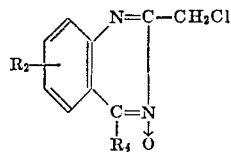

wherein $R_2$ and $R_4$ have the same meaning as above.

The quinazoline of Formula X above can then be reacted with an alkali metal hydroxide or alkaline earth metal hydroxide, preferably in an inert organic solvent such as ethanol, dioxane, or the like, to enlarge the ring to produce a 5-$R_4$-3H-1,4-benzodiazepin-2(1H)-one 4-oxide conforming to Formula III above, wherein $R_1$ is hydrogen, or it can be reacted with ammonia or a lower alkylamine to yield a 2-amino-5-$R_4$-3H-1,4-benzodiazepin 4-oxide or a 2-lower alkylamino-5-$R_4$-3H-1,4-benzodiazepin 4-oxide respectively. The latter two products are represented by Formula V above. The compounds of Formula III can be converted to compounds of Formula II by treatment with phosphorus trichloride or by catalytic hydrogenation, for example in the presence of Raney nickel. By the same procedures compounds of Formula V can be converted into compounds represented by Formula IV above.

Compounds corresponding to Formulas II and III above wherein $R_1$ represents hydrogen can be converted to corresponding compounds wherein $R_1$ represents lower alkyl by alkylation. This alkylation can be effected with a diazoalkane, alkyl sulfate or alkyl halide in a medium such as ether, benzene, alcohol, dimethylformamide or dioxane in the presence of an alkali metal or a derivative thereof in the form of an alcoholate, hydride or amide, e.g. sodium methoxide, lithium hydride, sodium amide, or the like. Alternatively compounds corresponding to Formulas II and III wherein $R_1$ is lower alkyl can be directly produced by using compounds corresponding to Formula VII above wherein $R_1$ is lower alkyl as starting materials. These can be produced by alkylation of compounds corresponding to Formula VII wherein $R_1$ is hydrogen.

The benzodiazepine compounds corresponding to Formula I above, i.e. those of Formulas II–V inclusive, are valuable therapeutic agents. They are useful as sedatives and anticonvulsants and can be used as tranquilizers or muscle relaxants. The compounds can be taken internally with dosage adjusted to individual requirements. Thus they can be administered parenterally or orally in conventional pharmaceutical dosage forms as solid or liquid dosage forms such as tablets, capsules, suspensions, elixirs and the like. As set forth above the compounds can also be administered in the form of their medicinally acceptable acid addition salts.

The following examples are illustrative of the invention but not limitative thereof. All temperatures are in degrees centigrade.

Example 1

A solution of 52.0 g. of 2-methyl-6-chloro-4H-3,1-benzoxazin-4-one in 250 cc. of dry benzene was prepared in a 3-necked flask with slight warming. The solution was then cooled and 50 cc. of dry ether was added. In another 3-necked round bottom flask—under anhydrous conditions—a solution of furyl lithium was prepared as follows: 5.0 g. of cut lithium wire was reacted with 52.5 g. of brombenzene in 150 cc. of ether under reflux conditions (2 hours) to form phenyl lithium. The solution was then cooled to room temperature and 17.0 g. of freshly distilled furan in 100 cc. of dry ether was added and the mixture refluxed for 3 hours. The solution containing the furyl lithium was then added to the solution of the benzoxazine under anhydrous condtions at room temperature and the mixture refluxed for 1.5 hours to complete the reaction.

The reaction mixture was cooled and treated with 60 cc. of 6 N hydrochloric acid and ice, and the resultant mixture concentrated to dryness. The residue was dissolved in 230 cc. of ethyl alcohol containing 35 cc. of concentrated hydrochloric acid and refluxed for 4 hours. The solution was then concentrated to dryness, suspended in water, and made basic with excess potassium carbonate. The basic material that separated was dissolved in benzene. The benzene solution was dried over anhydrous sodium sulfate, filtered, and concentrated to dryness. The residual oil was boiled out with one liter of heptane (B.P. 85–100°) and the heptane soluble separated and recovered by concentration. The residual oil crystallized on trituration with methanol and was recrystallized from methanol to give 2-amino-5-chlorophenyl 2-furyl ketone melting at 113°–114°.

Example 2

1 ml. (11 mmoles) of bromoacetyl bromide was added to a solution of 4.4 g. of 2-amino-5-chlorophenyl 2-furyl ketone dissolved in 800 ml. of ether. The reaction mixture was swirled and after 7 minutes the turbid ether solution was washed with 300 ml. of water. The addition of the bromoacetyl bromide was repeated 4 times. Following the final addition of acid halide, the reaction mixture was washed several times with water until the ether solution was neutral. The ether solution was then dried over sodium sulfate. The desiccant was removed by filtration and the filtrate was concentrated on a water bath. The residue was first triturated with a petroleum solvent boiling at 60–68° (Skellysolve "B") and then recrystallized from 1 liter of said petroleum solvent to yield 2-bromoacetamino-5-chlorophenyl 2-furyl ketone melting at 87–88° (uncorr.).

Example 3

200 ml. of 20% ammonia in methanol was added to a solution of 2.1 g. of 2-bromoacetylamino-5-chlorophenyl 2-furyl ketone in 200 ml. of methanol. The solution was swirled. After remaining overnight at room temperature, the reaction mixture was concentrated at reduced pressure on a water bath. The temperature of the water bath did not exceed 60°. The residue was leached with boiling C.P. ether. Dry hydrogen chloride gas was bubbled into the ether solution. The crude product, 7-chloro-5-(2-furyl)-3H-1,4-benzodiazepin-2(1H) - one hydrochloride, was collected on a Büchner funnel, dissolved in water, and the resulting solution saturated with potassium carbonate. The solid base, 7-chloro-5-(2-furyl)-3H-1,4-benzodiazepin-2(1H)-one, was isolated by filtration, air dried for several hours, and then crystallized from acetone; M.P. 245–246° (uncorr.).

Example 4

A Grignard reagent was prepared by the addition of 7.8 g. of ethyl iodide to 1.2 g. of magnesium in 200 ml. of dry ether containing 2 mg. of iodine. To this reaction solution 3.4 g. of dry distilled pyrrole in 25 ml. of dry ether was added.

The above pyrrole Grignard solution was added to 10 g. of 6-chloro-2-methyl-4H-3,1-benzoxazin-4-one and 100 ml. of dry ether.

The completed Grignard reaction was held at 30° for 1 hour and decomposed with ammonium chloride in ice water. The aqueous layer was separated from the ether layer, and the aqueous layer then extracted with ether. The combined ether extracts were concentrated to a solid and the solid treated with 100 ml. of methanol, 40 ml. of 30% sodium hydroxide and 60 ml. of water at reflux for 1 hour. The product was crystallized from a petroleum solvent boiling at 60–68° (Skellysolve "B"), yielding 2-amino-5-chlorophenyl 2-pyrryl ketone melting at 148–149°.

Example 5

4.4 g. of 2-amino-5-chlorophenyl 2-pyrryl ketone was dissolved in 350 ml. of anhydrous ether with an efficient stirrer so that good contact is obtained. To this in five alternate and equal portions are added a total quantity of 6.05 g. of bromoacetyl bromide in 125 ml. of dry ether, and 30 ml. of 1 N sodium hydroxide. The ether layer was separated and the aqueous solution was extracted with ether five minutes after the final addition of the reactants, and the ether extract concentrated to a solid which was crystallized from methanol (carbon) yielding 2-bromoacetamino-5-chlorophenyl 2-pyrryl ketone as a colorless material melting at 149–150°.

Example 6

30 g. of 2-bromoacetamido-5-chlorophenyl 2-pyrryl ketone was dissolved in 250 ml. of ether. This solution was slowly added to 250 g. of liquid ammonia with stirring. On standing overnight, the excess ammonia and all the ether evaporated to yield a white powder. This residual white powder was washed with water and recrystallized from ethanol yielding 2-aminoacetamino-5-chlorophenyl 2-pyrryl ketone melting at 196–197°.

Example 7

10.5 g. of 2-aminoacetamino-5-chlorophenyl 2-pyrryl ketone was dissolved in 300 ml. of pyridine. After refluxing for ½ hour, 50 ml. of pyridine was removed by distillation and then replaced by fresh, dry pyridine. After refluxing for 2½ hours, 100 ml. of pyridine was removed and replaced by fresh pyridine. Refluxing was then continued for 5 hours and the solution concentrated to a solid under vacuum. The residue was crystallized from ethanol twice to yield 7-chloro-5-(2-pyrryl)-3H-1,4-benzodiazepin-2(1H)-one melting at 262–263°.

Example 8

37 g. of anhydrous aluminum chloride was added slowly in portions to a suspension of 27.4 g. of 2-thenoylchloride and 31.0 g. of m-acetanisidine in 150 cc. of carbon disulfide kept at 20–25°. The suspension was stirred for ¾ hr. after the addition was completed, then kept at room temperature overnight. A dark viscous mass had separated in the flask. The reaction mixture was then stirred and heated to reflux for 1 hr. After cooling, carbon disulfide was decanted off and the residue decomposed with ice and dilute hydrochloric acid. The oil that separated was extracted with benzene and the organic layer then washed with dilute hydrochloric acid, water, dilute sodium hydroxide, and water. After drying over sodium sulfate, solvent was removed by concentration in vacuo. The residue was dissolved in 500 cc. of benzene and a 100 cc. aliquot removed for chromatography. The 100 cc. of aliquot in benzene was passed through a column containing 150 g. of Woelm alumina, grade I. The first fractions, eluted with benzene, were crystallized from hexane and yielded 2-acetamino-4-methoxyphenyl 2-thienyl ketone which upon recrystallization from hexane melted at 93–93.5°.

Example 9

A solution of 2.7 g. of 2-acetamino-4-methoxyphenyl 2-thienyl ketone in 30 cc. of acetic acid and 30 cc. of hydrochloric acid was refluxed for 3 hours. The reaction mixture was concentrated to dryness in vacuo and the residue stirred with dilute ammonia and extracted with chloroform. The chloroform extract was dried over sodium sulfate and solvent then removed in vacuo. The residue was crystallized from a mixture of benzene and hexane yielding 2-amino-4-methoxyphenyl 2-thienyl ketone which upon recrystallization from hexane melted at 75–76°.

Example 10

A solution of 1.5 g. of 2-amino-4-methoxyphenyl 2-thienyl ketone and 1.3 g. of glycine ethyl ester hydrochloride in 25 cc. of pyridine was refluxed for 1 hour. After distilling off 5 cc. of pyridine, an additional 1.3 g. of glycine ethyl ester hydrochloride was added and the reaction mixture stirred and refluxed for 16 hours. After concentration to dryness in vacuo, the residue was partitioned between benzene and water. The benzene layer was concentrated to dryness in vacuo and the residue was crystallized from benzene-hexane to give 8-methoxy-5-(2-thienyl)-3H-1,4-benzodiazepin-2(1H)-one which after decolorization in acetone was recrystallized from benzene-hexane and melted at 212.5–214°. Additional product was obtained by making the aqueous layer alkaline.

Example 11

Thiophene magnesium bromide prepared by the reaction of 17.8 g. of 2-bromo-thiophene with 2.6 g. of magnesium in 200 cc. of ether was slowly added to 16.1 g. of 2-methyl-3,1-4H-benzoxazine-4-one dissolved in 300 cc. of benzene and 100 cc. of ether while keeping the temperature at 5°. A yellow precipitate formed. The reaction mixture was kept at 0–5° for ¾ hr. and then for 1 hr. at room temperature. It was then chilled in a salt-ice bath and decomposed by the addition of 200 cc. of cold 2 N hydrochloric acid. The organic layer was separated and the mother liquors concentrated to dryness leaving a residue which was dissolved in 900 cc. of ether and 300 cc. of hexane and passed through a column containing 250 g. of Woelm alumina, neutral grade I. On elution with ether, and after crystallization from hexane 2-acetaminophenyl 2-thienyl ketone, was obtained which after recrystallization from hexane melted at 95–96°.

Example 12

A solution of 11.0 g. of 2-acetaminophenyl 2-thienyl ketone in 200 cc. of ethanol and 100 cc. of 6 N hydrochloric acid was refluxed for 2½ hrs. On cooling 8.0 g. of 2-aminophenyl 2-thienyl ketone hydrochloride crystallized. The free base was liberated (6.8 g.) but was not crystallized. An additional 2.2 g. of 2-aminophenyl 2-thienyl ketone was isolated from the alcoholic mother liquors. A solution of 9.0 g. of 2-aminophenyl 2-thienyl ketone and 9.3 g. of glycine ethyl ester hydrochloride in 100 cc. of pyridine was refluxed for 1 hr., then 15 cc. of pyridine was slowly distilled off. An additional 9.3 g. of glycine ethyl ester hydrochloride and 15 cc. of pyridine was added and refluxing continued for a total of 10 hrs. After concentration to dryness in vacuo, the residue was partitioned between benzene and water. The benzene layer was dried (sodium sulfate) and concentrated to dryness in vacuo. The residue upon crystallization from benzenehexane afforded 5-(2-thienyl)-3H-1,4-benzodiazepine-2(1H)-one which upon recrystallization from benzenehexane malted at 197–198°. Additional product was obtained by neutralization of the aqueous layer obtained above. Also the organic mother liquors from the crystallization were taken to dryness and refluxed for 17 hours in 50 cc. of pyridine with 5.0 g. of glycine ethyl ester hydrochloride to yield still additional product.

Example 13

A solution of 3.0 g. of 2-aminophenyl 2-thienyl ketone in 150 cc. of ether was stirred with 50 cc. of 0.5 N sodium hydroxide at 5°, and 3.1 g. of bromoacetyl bromide was then slowly added. After 30 minutes in the ice bath, the organic layer was separated, diluted with benzene, washed with water, and dried over sodium sulfate. After distillation of solvent in vacuo, the residue of crude 2-bromacetamino 2-thienyl ketone was dissolved in 100 cc. of 20% ammonia in methanol (w./v.) and kept overnight at room temperature. Solvent was then evaporated in vacuo and the residue extracted with hot benzene. On addition of hexane to the benzene extract, 5-(2-thienyl)-3H-1,4-benzodiazepin-2(1H)-one crystallized.

Example 14

5.5 g. of 5-(2-thienyl)-3H-1,4-benzodiazepin-2(1H)-one was slowly added to 50 cc. of concentrated sulfuric acid cooled to 5–10°. When all had dissolved, a solution of 1.45 cc. of nitric acid ($d=1.42$) in 5 cc. of concentrated sulfuric acid was added dropwise while keeping the temperature between 0° and $-5°$. After all the acid was added, the reaction was kept at 0° for 1 hr. and then poured onto ice and made slightly alkaline with ammonia. The crude product was filtered off and recrystallized from acetonitrile. In this manner 7-nitro-5-(2-thienyl)-3H-1,4-benzodiazepin-2(1H)-one was obtained, which upon recrystallization from acetonitrile melted at 265–266°.

Example 15

A Grignard reagent prepared by the reaction of 26.1 g. of 2-bromothiophene and 3.9 g. of magnesium in 200 cc. of ehter was slowly added to a suspension of 29.3 g. of 6-chloro-2-methyl-3,1-4H-benxoxazin-4-one in 450 cc. of benzene and 150 cc. of ether while maintaining the temperature at 0–5°. A yellow precipitate formed. The reaction mixture was stirred for ¾ hr. in an ice bath and for ¾ hr. at room temperature, then chilled in a salt-ice bath, and decomposed by the addition of 250 cc. of cold 2 N hydrochloric acid. The organic layer was separated, washed with water, dilute sodium hydroxide, and water, then dried over sodium sulfate. A greenish yellow oil was obtained after evaporation of the solvent in vacuo. Crystallization from benzene-hexane gave crude product which after recrystallization from hexane, in which a portion was insoluble, yielded 2-acetamino-5-chlorophenyl 2-thienyl ketone melting at 112–115°. Additional product could be recovered from the original benzene-hexane mother liquor.

Example 16

Crude 2-acetamino-5-chlorophenyl 2-thienyl ketone prepared as described above in Example 15 in a 0.05 mol run was hydrolyzed by refluxing for 2 hrs. with 150 cc. of ethanol and 50 cc. of concentrated hydrochloric acid. After evaporation of the reaction mixture to dryness in vacuo the residue was stirred with water and the resulting yellow crystalline product filtered off. Crystallization from hexane yielded 2-amino-5-chlorophenyl 2-thienyl ketone which upon further crystallization from hexane melted at 94.5–96°.

Example 17

20.8 g. of 2-acetamino-5-chlorophenyl 2-thienyl ketone was hydrolyzed by refluxing in 400 cc. of ethanol and 200 cc. of 6 N hydrochloric acid for 3 hrs. The solvent was distilled off in vacuo and the residue stirred with 200 cc. of ether and 200 cc. of water. The reaction mixture was made slightly alkaline with 40% sodium hydroxide, cooled to 0–5°, and 15.0 g. of bromoacetyl bromide slowly added with the simultaneous addition of 1 N sodium hydroxide to keep the reaction alkaline. When the reaction was completed, benzene was added to dilute the organic layer and the solid that had separated in the aqueous layer was filtered off and dried. The product was 2-bromoacetamino-5-chlorophenyl 2-thienyl ketone which upon being recrystallized twice from benzene-hexane melted at 148–149.5°.

Example 18

A solution of 4 g. of 2-amino-5-chlorophenyl 2-thienyl ketone and 3.5 g. of glycine ethyl ester hydrochloride in 75 cc. of pyridine was heated to reflux for 1 hr. After distilling off 10 cc. of pyridine, an additional 3.5 g. of glycine ethyl ester hydrochloride was added and the reaction refluxed for a total of 17 hrs. Solvent was evaporated in vacuo and the residue was partitioned between benzene and water. The organic layer was dried over sodium sulfate, concentrated to dryness in vacuo, and the residue crystallized from benzene-hexane to yield 7-chloro - 5 - (2 - thienyl) - 3H - 1,4 - benzodiazepin-2(1H)-one which upon recrystallization from benzene-hexane melted at 212–213.5°.

Example 19

14.9 g. of 2-bromoacetamino-5-chlorophenyl 2-thienyl ketone was stirred for 17 hrs. with 500 cc. of 20% (w./v.) ammonia in methanol for 17 hrs. A small amount of insoluble material was filtered off and the filtrate concentrated to dryness in vacuo. The residue was partitioned between benzene and water and the organic layer separated, dried over sodium sulfate and concentrated to dryness in vacuo. The residual 5.2 g. which did not crystallize was redissolved in benzene and extracted with dilute hydrochloric acid. Only 600 mg. of yellow material remained in the benzene layer. The acid layer was made slightly alkaline with dilute sodium hydroxide and re-extracted with benzene. The residue of 4.5 g., obtained by evaporation of solvent, was crystallized from acetone-hexane to give 7-chloro 5-(2-thienyl)-3H-1,4-benzodiazepin-2(1H)-one.

Example 20

A solution of 5.4 g. of 2-amino-5-chlorophenyl 2-thienyl ketone and 2.3 g. of hydroxylamine hydrochloride in 50 cc. of ethanol was refluxed for 17 hrs. Solvent was distilled off in vacuo and the residue partitioned between benzene and dilute sodium bicarbonate. The benzene layer was dried over sodium sulfate and concentrated to dryness in vacuo. Crystallization of the residue from benzene-hexane gave crude 2-amino-5-chlorophenyl 2-thienyl ketoxime. Additional product was isolated from the mother liquors. Repeated crystallization of a sample from benzene gave a product of constant melting point 142–143.5°.

Example 21

1.2 cc. of chloroacetyl chloride was added to a solution of 1.95 g. of the 2-amino-5-chlorophenyl 2-thienyl ketoxime obtained above in Example 20 in 10 cc. of acetic acid. There was a slight heat of reaction and the mixture was then kept at 60–70° for 2 hrs. Solvent was then distilled off in vacuo, and the residue dissolved twice in benzene and concentrated to dryness in vacuo. The residue thus obtained was slurried with ether and filtered yielding 6-chloro-2-chloromethyl-4-(2-thienyl)-quinazoline 3-oxide which upon crystallization from benzene-hexane melted at 159–160°.

Example 22

A suspension of 850 mg. of 6-chloro-2-chloromethyl-4-(2-thienyl)quinazoline 3-oxide in 20 cc. of 40° methylamine in methanol was stirred for 30 minutes in an ice bath and then stirred for 2 hrs. at room temperature. After chilling overnight in the refrigerator, 7-chloro-2-methylamino-5-(2-thienyl)-3H-1,4-benzodiazepine 4-oxide was filtered off and after crystallization from ethanol melted at 274–276°.

Example 23

A suspension of 1.0 g. of 6-chloro-2-chloromethyl-4-(2-thienyl)quinazoline 3-oxide in a mixture of 25 cc. of ethanol, 3.2 cc. of 1 N sodium hydroxide, and 5 cc. of acetone was stirred at 35° for ½ hr. and then for 16 hrs. at room temperature. A crystalline product was filtered off and the ethanol filtrate concentrated to dryness in vacuo to yield a residue which was crystallized from acetonitrile to yield 7-chloro-5-(2-thienyl)-3H-1,4-benzodiazepin-2(1H)-one 4-oxide which upon crystallization from acetonitrile melted at 252–254° (dec.).

Example 24

To a solution of 1.12 g. of sodium methoxide in 100 cc. of methanol, 5.0 g. of 5-(2-thienyl)-3-H-1,4-benzodiazepin-2(1H)-one was added. After stirring for 30 minutes, the mixture was concentrated to dryness in vacuo. The residue was dissolved in 50 cc. of dimethylformamide and concentrated to a small volume in vacuo to remove traces of methanol. The residue was again dissolved in 50 cc. of dimethylformamide and 2 cc. of methyl iodide were added. The temperature rose rapidly to 35°. After stirring for 30 minutes at room temperature, the solvent was distilled off in vacuo. The residue was then dissolved in ether, washed thoroughly with water and dried over sodium sulfate.

The ether was then distilled off and the residue crystallized from benzene and hexane to give 1-methyl-5-(2-thienyl)-3H-1,4-benzodiazepin-2(1H)-one melting at 107–109°.

What is claimed is:

1. A compound of the formula

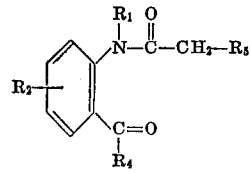

wherein $R_1$ is selected from the group consisting of hydrogen and lower alkyl; $R_2$ is selected from the group consisting of hydrogen, halogen, nitro and lower alkoxy; $R_4$ is selected from the group consisting of pyrryl and furyl; and $R_5$ is selected from the group consisting of hydrogen, halogen and amino.

2. 2-haloacetamino-5-halophenyl 2-furyl ketone.
3. 2-haloacetamino-5-halophenyl 2-pyrryl ketone.
4. 2-bromacetamino-5-chlorophenyl 2-furyl ketone.
5. 2-bromacetamino-5-chlorophenyl 2-pyrryl ketone.
6. 2-aminoacetamino-5-chlorophenyl 2-pyrryl ketone.
7. A compound of the formula

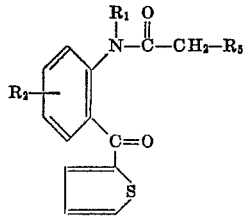

wherein $R_1$ is selected from the group consisting of hydrogen and lower alkyl; $R_2$ is selected from the group consisting of nitro and lower alkoxy; and $R_5$ is selected from the group consisting of hydrogen, halogen and amino.

8. 2-acetamino-4-methoxyphenyl 2-thienyl ketone.

References Cited

UNITED STATES PATENTS 3,344,183   9/1967   Reeder et al. _____ 260—556

JOHN D. RANDOLPH, *Primary Examiner.*

R. T. BOND, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,407,211                        October 22, 1968

Leo Berger et al.

It is certified that error appears in the above identified patent and that said Letters Patent are hereby corrected as shown below:

Column 9, line 16, "40°" should read -- 40% --.

Signed and sealed this 24th day of February 1970.

(SEAL)
Attest:

Edward M. Fletcher, Jr.
Attesting Officer

WILLIAM E. SCHUYLER, JR.
Commissioner of Patents